(12) United States Patent
Champagne et al.

(10) Patent No.: US 9,700,863 B2
(45) Date of Patent: Jul. 11, 2017

(54) USE OF DEPOLYMERISED CARBOXYLATED CELLULOSES FOR DISPERSING AND GRINDING MINERAL MATERIALS

(71) Applicant: COATEX, Genay (FR)

(72) Inventors: Clementine Champagne, Caluire-et-Cuire (FR); Christian Jacquemet, Lyons (FR); Jacques Mongoin, Quincieux (FR); Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 0 days.

(21) Appl. No.: 15/025,920

(22) PCT Filed: Oct. 27, 2014

(86) PCT No.: PCT/FR2014/052727
§ 371 (c)(1),
(2) Date: Mar. 30, 2016

(87) PCT Pub. No.: WO2015/063402
PCT Pub. Date: May 7, 2015

(65) Prior Publication Data
US 2016/0236163 A1   Aug. 18, 2016

(30) Foreign Application Priority Data

Nov. 4, 2013 (FR) ...................... 13 60787

(51) Int. Cl.
| | |
|---|---|
| *B01F 17/48* | (2006.01) |
| *B01F 17/00* | (2006.01) |
| *C09C 3/04* | (2006.01) |
| *C09C 1/02* | (2006.01) |
| *C09C 1/40* | (2006.01) |
| *C09C 1/42* | (2006.01) |
| *C09C 1/30* | (2006.01) |
| *C09C 1/36* | (2006.01) |

(52) U.S. Cl.
CPC ............ *B01F 17/0028* (2013.01); *C09C 1/02* (2013.01); *C09C 1/021* (2013.01); *C09C 1/028* (2013.01); *C09C 1/3018* (2013.01); *C09C 1/3623* (2013.01); *C09C 1/402* (2013.01); *C09C 1/405* (2013.01); *C09C 1/407* (2013.01); *C09C 1/42* (2013.01); *C09C 3/04* (2013.01); *C09C 3/041* (2013.01)

(58) Field of Classification Search
CPC ....... B01F 17/0028; C09C 1/02; C09C 1/021;
C09C 1/028; C09C 1/402; C09C 1/405;
C09C 1/407; C09C 1/42; C09C 1/3018;
C09C 1/3623; C09C 3/04; C09C 3/041
See application file for complete search history.

(56) References Cited

U.S. PATENT DOCUMENTS

| 2003/0114539 A1* | 6/2003 | Weaver ................... C09K 8/62 516/53 |
| 2004/0242862 A1 | 12/2004 | Hammes |
| 2008/0072785 A1 | 3/2008 | Suau et al. |
| 2009/0229775 A1 | 9/2009 | Zhang et al. |
| 2015/0267114 A1* | 9/2015 | Di Modugno ......... C09K 17/32 504/362 |
| 2016/0237280 A1* | 8/2016 | Rentsch ................ C09C 3/041 |

FOREIGN PATENT DOCUMENTS

| DE | 102 53 812 A1 | 5/2004 |
| FR | 2 873 046 A1 | 1/2006 |
| WO | 03/018637 A1 | 3/2003 |

OTHER PUBLICATIONS

International Search Report Issued Mar. 10, 2015 in PCT/FR14/52727 Filed Oct. 27, 2014.

* cited by examiner

*Primary Examiner* — Anthony J Green
(74) *Attorney, Agent, or Firm* — Oblon, McClelland, Maier & Neustadt, L.L.P.

(57) ABSTRACT

The present invention concerns the use of depolymerized carboxylated celluloses as a dispersing agent or grinding aid agent for aqueous suspensions of mineral materials, intended for paint formulations, plastic formulations, detergent formulations, cosmetic formulations, paper formulations or paper coating colors.

16 Claims, No Drawings

USE OF DEPOLYMERISED CARBOXYLATED CELLULOSES FOR DISPERSING AND GRINDING MINERAL MATERIALS

The present invention relates to the use of depolymerized carboxylated celluloses as a dispersing agent or grinding aid agent for aqueous suspensions of mineral materials.

Suspensions, or "slurries", of mineral materials are suspensions of solids that are insoluble in a liquid medium, which is generally a mixture of water and an additive. The characteristics of the slurries, notably the size of the particles of mineral material and the nature of the additive, depend on the use for which these slurries are required. The latter are, in fact, used as inorganic filler in a variety of different applications (e.g. paints, plastics, cosmetics, paper, paper coating colors).

The use of acrylic acid polymers of low molecular weight, completely or partially neutralized, as a dispersing agent or a grinding aid agent for mineral particles in aqueous suspension, is known. The use of acrylic acid copolymers as a dispersing agent or a grinding aid agent is also known.

One aim of the present invention is to propose a dispersing agent or grinding aid agent for mineral materials in suspension of a different nature than the agents of the acrylic acid polymer or copolymer type available commercially. More precisely, the present invention relates to the use, as a grinding aid agent and dispersing agent for mineral particles in suspension, of a carboxylated cellulose that has been depolymerized to have an optimal molecular weight for the present application.

Another aim of the present invention is to propose a grinding aid agent and dispersing agent of mineral particles in suspension of biosourced origin, i.e. not derived from a fossil fuel. This approach is within the concepts of green chemistry and sustainable development.

Cellulose is a linear polymer formed from units of β-anhydroglucose, also called "glucose unit" or "glucosyl". Each anhydroglucose unit contains three hydroxyl groups. A carboxylated cellulose such as carboxymethylcellulose (CMC) is prepared by reacting a proportion of the hydroxyls of the cellulose with sodium monochloroacetate (sodium being used as a representative example of an alkali metal) or monochloroacetic acid, according to the following two steps:

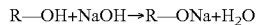

R—OH+NaOH→R—ONa+H$_2$O

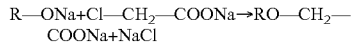

R—ONa+Cl—CH$_2$—COONa→RO—CH$_2$—COONa+NaCl

CMC has several defining technical characteristics. One of its characteristics is its degree of substitution (DS), or in other words the average number of carboxymethyl groups grafted on the molecule per glucose unit. The degree of substitution is also called degree of carboxylation. Commercial products may for example have a DS between about 0.4 and about 1.4. Thus, as a guide, a commercially available CMC having a DS of 0.8 has on average 0.8 carboxymethyl group grafted per glucose unit, some glucose units not having any carboxymethyl group and other glucose units comprising 1, 2 or 3 carboxymethyl groups. Other technical characteristics are the molecular weight (Mw), as well as the degree of polymerization (DP), i.e. the number of glucose units per molecule of CMC.

It is known to perform depolymerization of CMC, i.e. to lower its molecular weight, by means of an oxidative treatment.

Many methods for depolymerization of CMC known to date take several days and do not give solutions with a high solids content. It is advantageous on the one hand to reduce the time for depolymerization of CMC and thus increase the yield of depolymerized CMC, and on the other hand to obtain a solution of depolymerized CMC with a high solids content and thus lower the costs connected with delivery of the product to the users. In fact, if the solids content is high, more active material is transported, and less water.

Document EP 0 465 992 (Aqualon Company) describes a method for depolymerization of CMC using hydrogen peroxide, the process being continuous, batch, or incremental.

However, this document does not describe the use of CMC for grinding or dispersing mineral materials in suspension. Nor does it describe the importance of selection of the molecular weight of the depolymerized CMC and of neutralization for the application of grinding or dispersion of suspensions of mineral materials.

One object of the present invention relates to the use of a solution of depolymerized carboxylated cellulose for grinding and/or dispersing aqueous suspensions of mineral material, said solution of depolymerized carboxylated cellulose having a solids content between 25 and 40 wt % relative to the total weight of the solution, and said depolymerized carboxylated cellulose having a molecular weight between 10 000 and 40 000 g/mol.

Another object of the present invention consists of a grinding aid agent or dispersing agent of mineral material, consisting of a solution of depolymerized carboxylated cellulose having a solids content between 25 and 40 wt % relative to the total weight of the solution, said depolymerized carboxylated cellulose having a molecular weight between 10 000 and 40 000 g/mol.

"Carboxylated cellulose" means a cellulose that has been modified chemically and comprises carboxyl units, for example carboxymethyl units —CH$_2$—COOH. Carboxylated cellulose is, at least partially, of biosourced origin. It may be supplied in the form of powder or in the form of solution, for example in the form of an aqueous solution.

According to one embodiment of the present invention, the carboxylated cellulose is carboxymethylcellulose.

According to one embodiment of the present invention, the depolymerized carboxylated cellulose has a molecular weight between 13 000 and 35 000 g/mol, for example between 13 000 and 25 000 g/mol.

According to one embodiment of the present invention, said depolymerized carboxylated cellulose has a polydispersity index PI between 2 and 10, for example between 3 and 5.

The polydispersity index PI corresponds to the distribution of the molecular weights of the various macromolecules within the cellulose obtained. If all the macromolecules have one and the same molecular weight, the index PI decreases and approaches the theoretical value of 1. If in contrast the macromolecules have different molecular weights, the index PT increases.

In the context of the present invention, the index PI of the depolymerized carboxylated cellulose is between 2 and 10, for example between 3 and 5.

According to one embodiment of the present invention, the solution of depolymerized carboxylated cellulose has a solids content above 30 wt %, for example between 30 and 40 wt % relative to the total weight of the solution, for example between 31 and 35 wt %.

This may be regarded as a high solids content in the present field of technology. This offers many advantages in terms of productivity, transport and implementation. Notably, no concentration step of the solution is required before transport or use.

According to one embodiment of the present invention, said solution of depolymerized carboxylated cellulose is obtained by a method comprising:

1) a depolymerization step according to which:
   1a) a carboxylated cellulose to be depolymerized is provided, having a degree of substitution between 0.2 and 2,
   1b) a reactor containing water is heated to a temperature between 50 and 85° C. (inclusive), for example to a temperature between 75 and 85° C. (inclusive),
   1c) the carboxylated cellulose to be depolymerized and a peroxide are added to the reactor gradually and simultaneously, maintaining the temperature according to 1b),
   1d) after adding all of the reactants according to 1c), the temperature of the mixture is maintained according to 1b) until there is complete consumption of the peroxide,
2) a step of cooling the mixture to a temperature below 75° C., for example to a temperature below 70° C.,
3) optionally a step of neutralization of the mixture.

"Carboxylated cellulose to be depolymerized" means a carboxylated cellulose of high molecular weight, compared to the molecular weight of the depolymerized carboxylated cellulose used for grinding and/or dispersing mineral material.

According to one embodiment of the present invention, the carboxylated cellulose to be depolymerized has a molecular weight greater than 40 000 g/mol, for example between 200 000 and 300 000 g/mol, for example between 220 000 and 280 000 g/mol.

The method described above, of the continuous or incremental type, makes it possible to obtain a carboxylated cellulose with a high solids content. This results in a depolymerized carboxylated cellulose that in addition has an index PI between 2 and 10, for example between 3 and 5 This continuous method of depolymerization is advantageous relative to a method of the batch type, which requires carrying out a preliminary step of solubilization of the cellulose. This preliminary step consists of dissolving a specified amount of cellulose powder, with stirring. This preliminary step may be long, for example more than 10 hours, to obtain a solution of cellulose to be depolymerized at 10% of solids content.

According to one embodiment of the present invention, the carboxylated cellulose to be depolymerized has a degree of substitution between 0.7 and 2, for example between 0.5 and 1.8 or between 0.6 and 1.4.

Said method for depolymerization of carboxylated cellulose optionally comprises an additional step which consists of adding at least one other agent, for example a catalyst, a metal salt or a reducing agent, to said reactor containing water. For example, this other agent may be selected from ferrous sulfate, sodium hypophosphite, iron phthalocyanine or sodium tungstate.

According to one embodiment of the present invention, said peroxide is hydrogen peroxide.

According to another embodiment, said peroxide is hydrogen peroxide and is used in an amount by weight from 20 to 50 wt % relative to the total amount of carboxylated cellulose introduced into the reactor during the process.

According to one embodiment of the present invention, said method for preparing the solution of depolymerized carboxylated cellulose comprises a step of complete or partial neutralization by means of one or more neutralizing agents selected from the group consisting of sodium hydroxides, calcium hydroxides, magnesium hydroxides, potassium hydroxides and amines.

According to another embodiment of the present invention, said method for preparing the solution of depolymerized carboxylated cellulose comprises a step of complete or partial neutralization by means of solutions of NaOH and of $Ca(OH)_2$.

According to one embodiment of the present invention, said method for preparing the solution of depolymerized carboxylated cellulose consists of a depolymerization step, a cooling step and a neutralizing step. According to this embodiment, said method of preparation does not comprise a preliminary step of solubilization of the carboxylated cellulose. According to another embodiment, said method does not comprise a step consisting of concentrating the depolymerized carboxylated cellulose thus obtained.

The solution of depolymerized carboxylated cellulose according to the present invention is used for grinding and/or dispersing a mineral material in an aqueous suspension.

According to one embodiment of the present invention, said mineral material is selected from the group consisting of natural calcium carbonate, synthetic calcium carbonate, dolomites, kaolin, talc, gypsum, lime, magnesia, titanium dioxide, satin white, aluminum trioxide, aluminum trihydroxide, silicas, mica and mixtures thereof.

According to another embodiment, said mineral material is calcium carbonate.

For the purposes of the present invention, the term "calcium carbonate" refers to a substance that comprises at least 80 wt % of calcium carbonate. The term "calcium carbonate" comprises ground calcium carbonate (GCC), i.e. a calcium carbonate obtained from natural sources, such as limestone, marble, calcite or lime, as well as precipitated calcium carbonate (PCC), i.e. a synthesized substance, generally obtained by precipitation following reaction of carbon dioxide and calcium hydroxide (hydrated lime) in an aqueous environment or by precipitation of a source of calcium and of carbonate in water. Moreover, precipitated calcium carbonate may also be the product of introduction of calcium and carbonate salts, calcium chloride and sodium carbonate for example, in an aqueous environment. The PCC may be vaterite, calcite or aragonite.

According to another embodiment, the aqueous suspension according to the present invention is composed of water, a mineral material as defined above, for example calcium carbonate, and a depolymerized carboxylated cellulose according to the present invention. According to this embodiment, the aqueous suspension does not comprise any additive other than the depolymerized carboxylated cellulose described in the present application, i.e. it does not comprise, for example, another polymer or dispersing agent.

According to one embodiment of the present invention, said solution of depolymerized carboxylated cellulose is present in the aqueous suspension of mineral material in an amount as it is from 0.01 to 8 wt %, based on the total weight of the solids in the suspension, for example from 0.1 to 5 wt %.

According to another embodiment of the present invention, said solution of depolymerized carboxylated cellulose is present in the aqueous suspension of mineral material in an amount from 0.01 to 3% dry weight, based on the total weight of the solids in the suspension, for example from 0.1 to 1.5% dry weight.

The depolymerized carboxylated cellulose according to the present invention is used for dispersing and/or grinding a mineral material, for example calcium carbonate. "Dispersion" consists of preparing, with stirring, a suspension of mineral material, for example of calcium carbonate. More precisely, it may in particular consist of introducing some or all of the depolymerized carboxylated cellulose according to the invention into the aqueous phase (i.e. water), and then the calcium carbonate, so as to obtain an aqueous suspension having a specified calcium carbonate content. In other words, the dispersion step may consist of mixing the depolymerized carboxylated cellulose with water, and then mixing the calcium carbonate with the solution of depolymerized carboxylated cellulose. As a variant, it may consist of introducing some or all of the calcium carbonate into the aqueous phase (i.e. water), and then the depolymerized carboxylated cellulose according to the invention. In this case, the dispersion step consists of mixing the calcium carbonate component with water, and then mixing the depolymerized carboxylated cellulose with the suspension of calcium carbonate.

The dispersion step may be carried out in a mixer or in any other equipment that has the capacity to mix homogeneously or homogenize the components of the suspension. A person skilled in the art will adapt to these conditions of mixing and/or of homogenizing, such as the mixing speed and the temperature, depending on the process equipment available.

The term "grinding" signifies that the mineral particles are divided into smaller particles. The grinding step may take place in a grinding mill or in any other equipment that has the capacity to divide the particles of calcium carbonate into smaller particles.

The dispersion step and the mixing step may be carried out at room temperature, i.e. at 20° C. or at other temperatures, for example at temperatures varying between 5 and 140° C. Heating may be introduced by internal shearing or by an external source or a combination of the two.

The aqueous suspension of mineral material, for example of calcium carbonate, may be obtained by a method comprising 1/ a dispersion step and 2/ a grinding step. As a variant, the aqueous suspension of mineral material, for example of calcium carbonate, may be obtained by a method comprising 1/ a grinding step and 2/ a dispersion step. According to another method, the aqueous suspension of mineral material, for example of calcium carbonate, may be obtained by a method comprising 1/ a grinding step as far as a specified solids content SC1 and a specified granulometric distribution PSD1, 2/ a dispersion step and 3/ a grinding step as far as a specified solids content SC2 and a specified granulometric distribution PSD2. According to another method, the dispersion step and the mixing step may be carried out at the same time.

The method for preparing an aqueous suspension of mineral material, for example of calcium carbonate, may also comprise a concentration step. The term "concentration" signifies reduction of the water content of the suspension, so as to adjust the solids content of the aqueous suspension. The concentration step may be carried out by the methods known by a person skilled in the art. It may in particular be carried out by a thermal means, for example by means of an evaporator or any other suitable evaporation equipment.

The aqueous suspension of mineral material, for example of calcium carbonate, may be dried by any suitable method known in the art. It may in particular be dried thermally, for example by means of a hair dryer, or it may be dried mechanically, for example by means of filters.

According to one embodiment, the present invention relates to the use of a depolymerized carboxylated cellulose for grinding and/or dispersing aqueous suspensions of mineral material, for example calcium carbonate, having a granulometric distribution such that at least 60 wt % of the particles of mineral material have an equivalent diameter less than or equal to 2 µm, for example about 60 wt %, about 75 wt % or about 90 wt % of the particles have an equivalent diameter less than or equal to 2 µm.

According to one embodiment of the present invention, said aqueous suspension has a Brookfield viscosity below 1000 mPa·s, as measured just after grinding with a viscosimeter of the Brookfield DVII type at 25° C. and a speed of 100 rev/min.

According to this embodiment, said suspension is sufficiently fluid to be handled without difficulty.

According to one embodiment of the present invention, said aqueous suspension is intended for a paint formulation, a plastic formulation, a detergent formulation, a cosmetic formulation, a paper formulation or a paper coating color.

According to another embodiment, the present invention relates to the use of a solution of depolymerized carboxylated cellulose, for example carboxymethylcellulose, for grinding and/or dispersing aqueous suspensions of mineral material, for example calcium carbonate, said solution of depolymerized carboxylated cellulose having a solids content between 30 and 40 wt % relative to the total weight of the solution, for example between 31 and 35 wt %, said depolymerized carboxylated cellulose having a molecular weight between 13 000 and 35 000 g/mol, for example between 13 000 and 25 000 g/mol and an index PI between 3 and 10, for example between 3 and 5.

According to this embodiment, said solution of carboxylated cellulose may be obtained by a method comprising:
1) a depolymerization step according to which:
   1a) a carboxylated cellulose to be depolymerized is provided, of molecular weight greater than 40 000 g/mol, for example between 200 000 and 300 000 g/mol, for example between 220 000 and 280 000 g/mol, and having a degree of substitution between 0.2 and 2, for example between 0.7 and 2,
   1b) a reactor containing water, and optionally a catalyst, a metal salt or a reducing agent, is heated to a temperature between 50 and 85° C. (inclusive), for example to a temperature between 75 and 85° C. (inclusive),
   1c) the carboxylated cellulose to be depolymerized and a peroxide, for example hydrogen peroxide, are added to the reactor gradually and simultaneously, maintaining the temperature according to 1b),
   1d) after adding all of the reactants according to 1c), the temperature of the mixture is maintained according to 1b) until there is complete consumption of the peroxide,
2) a step of cooling the mixture to a temperature below 75° C., for example to a temperature below 70° C., and
3) a step of neutralization of the mixture, for example with sodium hydroxide.

The following examples will provide a better understanding of the present invention, without limiting its scope.

EXAMPLES

Example 1

This example illustrates a method for preparing a solution of depolymerized carboxymethylcellulose (CMC) according to the invention or not according to the invention, as well as the characteristics (viscosity, solids content, Mw, PI) of the solutions thus obtained.

CMC1 (According to the Invention)

Depolymerization Step

A 1-liter reactor is charged with 800 g of bi-permuted water and 0.017 g of $FeSO_4 \cdot 7H_2O$ catalyst. The reactor is heated to 80±2° C. Then, over the space of 2 h 45 min, a solution of hydrogen peroxide at 35 wt % is injected at 189 mg/min, as well as CMC (Sigma-Aldrich, reference 419281, Mw=250 000 g/mol, DS=1.2) in 25-g aliquots every 15 minutes (continuous method). The reaction is left to continue for 2.5 h after the end of injection. A check that all of the hydrogen peroxide has been consumed is carried out.

Cooling Step

The reactor is cooled to 70° C. The pH as measured in the reactor is 4.4.

Neutralizing Step

A 50% NaOH solution is added so as to reach a pH of 7.4.

CMC2 (not According to the Invention)

The method breaks down into a preliminary step of solubilization of the CMC as well as three subsequent reaction steps.

According to this batch method, all of the CMC is added to the reactor in liquid form before adding peroxide.

Step of Preparation of the Solution of CMC

A beaker is charged with 850 g of bi-permuted water and then 74.4 g of CMC (Sigma-Aldrich, reference 419281, Mw=250 000 g/mol, DS=1.2) is introduced gradually, with stirring.

Depolymerization Step 870 g of the solution of liquid CMC is transferred to a reactor, which is heated to 80±2° C. Then injection of a solution of hydrogen peroxide at 35 wt % is started. Then injection of 0.78 g of hydrogen peroxide at 35 wt % is repeated every 2 hours, for 8 hours. The reaction is left to continue after the end of injection until all of the hydrogen peroxide has been consumed.

Consumption of the hydrogen peroxide is checked by a test with titanium oxysulfate(IV)-sulfuric acid (Sigma-Aldrich reference 89532).

Cooling Step

The reactor is cooled to 70° C. The pH as measured in the reactor is 5.4.

Neutralizing Step

A 50% NaOH solution and/or 10% CaOH solution is added, so as to reach a pH of 7.8.

Characterization of the Solution of Depolymerized CMC Obtained

Brookfield Viscosity

The viscosity is measured in the reactor at the start of the process (time $t_0$) and then that of the solution of CMC obtained, using a Brookfield viscosimeter, model RVT, at 10 rpm using a suitable module.

Molecular Weight (Mw) and Index PI

The molecular weight of the CMC is determined by size exclusion chromatography (SEC), also called "gel permeation chromatography" (GPC).

This technique employs liquid chromatography apparatus of WATERS™ mark, equipped with a detector. This detector is a detector of refractometric concentration of WATERS™ mark.

This liquid chromatography equipment is provided with a size exclusion column suitably selected by a person skilled in the art for separating the different molecular weights of the CMCs investigated. The elution liquid phase is an aqueous phase adjusted to pH 9.00 with 1N soda containing 0.05M of $NaHCO_3$, 0.1M of $NaNO_3$, 0.02M of triethanolamine and 0.03% of $NaN_3$.

In detail, according to a first step, the solution of CMC is diluted to 0.9% dry weight in the solubilization solvent for SEC, which corresponds to the liquid phase for elution in SEC, to which 0.04% of dimethylformamide is added, which performs the role of flow marker or internal standard. Then it is filtered at 0.2 μm. 100 μL is then injected into the chromatography apparatus (eluent: an aqueous phase adjusted to pH 9.00 with 1N soda containing 0.05M of $NaHCO_3$, 0.1M of $NaNO_3$, 0.02M of triethanolamine and 0.03% of $NaN_3$).

The liquid chromatography apparatus contains an isocratic pump (WATERS™ 515) whose flow rate is set at 0.8 ml/min. The chromatography apparatus also comprises a furnace, which in its turn comprises the following system of columns in series: a precolumn of the GUARD COLUMN ULTRAHYDROGEL WATERS™ type with a length of 6 cm and inside diameter of 40 mm, and a linear column of the ULTRAHYDROGEL WATERS™ type with a length of 30 cm and inside diameter of 7.8 mm. As for the detection system, it is made up of a refractometric detector of the RI WATERS™ 410 type. The furnace is heated to a temperature of 60° C., and the refractometer is heated to a temperature of 45° C.

The chromatography apparatus is calibrated using standards of sodium polyacrylate powder of different molecular weights certified for the supplier: POLYMER STANDARD SERVICE or AMERICAN POLYMER STANDARDS CORPORATION.

The polydispersity index PI of the cellulose obtained is the ratio of the weight-average molecular weight Mw to the number-average molecular weight Mn.

The results of characterization of the solution of depolymerized CMC obtained are presented in Table 1 below:

TABLE 1

| | CMC1 | CMC2 |
|---|---|---|
| $V_B$ at $t_0$ (mPa · s) | =water | 18 500 |
| $V_B$ of the solution of depolymerized CMC obtained (mPa · s) | 725 | 25 |
| SC (wt %) | 33.9 | 8 |
| Total process time | 4 h 45 | >20 h |
| Mw (g/mol) | 13 310 | 14 085 |

Regarding the method for preparing the depolymerized CMC1, it is noted that the viscosity in the reactor at t0 is that of water, which makes the method for preparing the CMC1 easier to carry out. Moreover, this method gives a solution of depolymerized CMC with high solids content (33.9%), which offers many advantages for use thereof as grinding aid agent or dispersing agent of mineral material.

Moreover, the time for preparation of the depolymerized CMC1 is short (4 h 45 min), relative to batch methods (CMC2), which may take several days to reach a lower solids content. The end product of this transformation is a liquid solution of low viscosity (725 mPa·s).

Example 2

This example illustrates the performance in grinding different solutions of carboxymethylcellulose that have been depolymerized by a method according to example 1. The depolymerized CMCs differ from one another, notably with respect to their molecular weights (see Table 2). The depolymerized CMCs in the following examples were neutralized with a 50% NaOH solution or a 10% suspension of $Ca(OH)_2$.

Grinding efficiency is measured by the amount of mineral material that can be ground in water and the grinding time required, but without the viscosity of the suspension produced making the latter impossible to handle, transport or pump.

Various aqueous suspensions of ground calcium carbonate (GCC), each having a solids content of 75±1%, are prepared in the presence of 0.35% dry weight of a solution of depolymerized CMC (as grinding aid agent), based on the total amount of solids in the suspension.

The calcium carbonate used is ground calcium carbonate, marble of Italian origin.

The suspensions of coarse calcium carbonate are fed into a DYNO MILL grinding mill, type KDL pilot 1.4 L containing 2500 g of grinding beads (Ø 0.6-1 mm).

The grinding operations are carried out so as to obtain an aqueous suspension at 75% concentration, in which 60% of particles have an equivalent spherical diameter less than 2 microns.

The grinding efficiency of the solutions of depolymerized CMCs (tests 2-2 to 2-13) is compared with that of a polyacrylic acid polymer of molecular weight 5700 g/mol completely neutralized with sodium marketed by Coatex (test 2-1), tested in the same conditions at 0.26% dry weight based on the total amount of solids in the suspension.

The suspensions obtained are characterized. All the results are given in Table 2 below.

The viscosity (expressed in mPa·s) of each suspension is measured at 25° C. with a viscosimeter of the Brookfield DVIII type. The viscosity values shown are measured just after grinding at a speed of 100 rev/min.

TABLE 2

| Test | | Mw (g/mol) | Index PI | Neutralization | pH | SC (wt %) | Grinding time (min) | $V_B$ after grinding 100 rpm (mPa · s) |
|---|---|---|---|---|---|---|---|---|
| 2-1 | PA | 5500 | 2.6 | Na | 8.5 | 41.0 | 20 | 451 |
| 2-2 | NINV | 2180 | 2.2 | Na | 8.6 | 30.1 | 10 | Too viscous |
| 2-3 | NINV | 3685 | 3.6 | Na | 7.4 | 29.9 | 7 | Too viscous |
| 2-4 | NINV | 6020 | 4 | Na | 7.4 | 32.0 | 17 | Too viscous |
| 2-5 | NINV | 9760 | 4.4 | Na | 8.0 | 32.7 | 17 | Too viscous |
| 2-6 | INV | 10 070 | 3.9 | Na | 9.8 | 33.4 | 17 | 832 |
| 2-7 | INV | 11 025 | 3.9 | Na | 8.6 | 32.7 | 18 | 658 |
| 2-8 | INV | 13 217 | 4.0 | Ca/Na | 8.3 | 32.3 | 10 | 588 |
| 2-9 | INV | 18 800 | 4.2 | Na | 9.8 | 33.8 | 16 | 454 |
| 2-10 | INV | 23 010 | 4.2 | Na | 10.2 | 33.3 | 18 | 284 |
| 2-11 | INV | 29 695 | 4.4 | Na | 9.4 | 33.4 | 18 | 504 |
| 2-12 | INV | 34 520 | 4.4 | Na | | 32.8 | 16 | 555 |
| 2-13 | NINV | 49 085 | 4.1 | Na | 10.6 | 3.0 | — | Too viscous |

Na: neutralization with a 50% NaOH solution
Ca/Na: neutralization 10/90 with a 10% suspension of $Ca(OH)_2$ and a 50% NaOH solution According to the results presented in Table 2, it can clearly be seen that it is essential to adjust the molecular weight of the CMC for the grinding application.

The stability of the suspensions is investigated after storage for 8 days at 25° C. The viscosity values are measured before and after stirring (using equipment of the Rayneri type, for example).

All the suspensions prepared using a depolymerized CMC according to the invention have a Brookfield viscosity at 100 rev/min (before or after stirring) that allows handling in industrial processes.

The invention claimed is:

1. A process, comprising grinding, dispersing, or both grinding and dispersing, mineral material in the presence of an aqueous solution of depolymerized carboxylated cellulose, wherein:
   the aqueous solution of the depolymerized carboxylated cellulose has a solids content ranging from 25 wt % to 40 wt % relative to a total weight of the aqueous solution; and
   the depolymerized carboxylated cellulose has a molecular weight ranging from 10,000 g/mol to 40,000 g/mol.

2. The process of claim 1, wherein the depolymerized carboxylated cellulose is carboxymethylcellulose.

3. The process of claim 1, wherein the depolymerized carboxylated cellulose has a polydispersity index PI ranging from 2 to 10.

4. The process of claim 1, wherein the depolymerized carboxylated cellulose is partially or completely neutralized with one or more neutralizing agents selected from the group consisting of sodium hydroxide, calcium hydroxide, magnesium hydroxide, potassium hydroxide and an amine.

5. The process of claim 1, wherein the solution of the depolymerized carboxylated cellulose is obtained by a method comprising:
   1) depolymerisation, wherein:
      1a) a reactor containing water is heated to a temperature between 50 and 85° C. (inclusive),
      1b) a carboxylated cellulose to be depolymerized, having a degree of substitution between 0.2 and 2, and a peroxide are added to the reactor gradually and simultaneously, maintaining the temperature according to 1a), and
      1c) after adding all of the reactants according to 1b) to form a mixture, the temperature of the mixture is maintained according to 1a) until there is complete consumption of the peroxide;
   2) cooling the mixture to a temperature below 75° C.; and
   3) optionally neutralizing the mixture.

6. The process of claim 1, wherein the mineral material is selected from the group consisting of natural calcium carbonate, synthetic calcium carbonate, a dolomite, kaolin, talc, gypsum, lime, magnesia, titanium dioxide, satin white, aluminum trioxide, aluminum trihydroxide, a silica, mica and mixtures thereof.

7. The process of claim 1, wherein the mineral material is present in said aqueous solution of the depolymerized cellulose in the form of an aqueous suspension of said mineral material during said grinding, dispersing, or both grinding and dispersing, and wherein said depolymerized cellulose is present in an amount from 0.01 to 8 wt %, based on the total weight of the solids in the suspension.

8. The process of claim 1, wherein the mineral material is present in said aqueous solution of the depolymerized cellulose in the form of an aqueous suspension of said mineral material during said grinding, dispersing, or both grinding and dispersing, and wherein the aqueous suspension of mineral material has a granulometric distribution such that at least 60 wt % of particles have an equivalent diameter less than or equal to 2 µm.

9. The process of claim 1, wherein the process produces an aqueous suspension that has a Brookfield viscosity below 1000 mPa·s, as measured just after grinding with a viscosimeter of the Brookfield DVIII type at 25° C. and a speed of 100 rev/min.

10. The process of claim 1, wherein the process produces an aqueous suspension is adapted to function as a paint formulation, a plastic formulation, a detergent formulation, a cosmetic formulation, a paper formulation or a paper coating color.

11. The process of claim 1, wherein the mineral material is calcium carbonate.

12. A composition comprising
an aqueous solution of a depolymerized carboxylated cellulose having a solids content between 25 and 40 wt % relative to a total weight of the solution, said depolymerized carboxylated cellulose having a molecular weight ranging from 10,000 g/mol to 40,000 g/mol, and
a mineral material present in said aqueous solution of the depolymerized carboxylated cellulose in the form of an aqueous suspension of said mineral material,
wherein said mineral material is selected from the group consisting of calcium carbonate, a dolomite, kaolin, talc, gypsum, lime, magnesia, titanium dioxide, satin white, aluminum trioxide, aluminum trihydroxide, a silica, mica and mixtures thereof.

13. The composition of claim 12, wherein the mineral material is calcium carbonate.

14. The composition of claim 12, wherein the depolymerized carboxylated cellulose is carboxymethylcellulose.

15. The composition of claim 12, wherein the depolymerized carboxylated cellulose has a polydispersity index PI ranging from 2 to 10.

16. The composition of claim 12, wherein the mineral material is calcium carbonate, and wherein the aqueous suspension of calcium carbonate has a granulometric distribution such that at least 60 wt % of particles have an equivalent diameter less than or equal to 2 µM.

* * * * *